US009181431B2

(12) United States Patent
Donovan et al.

(10) Patent No.: US 9,181,431 B2
(45) Date of Patent: Nov. 10, 2015

(54) POLYIMIDE RESIN COMPOSITIONS

(71) Applicant: SABIC GLOBAL TECHNOLOGIES B.V., Bergen Op Zoom (NL)

(72) Inventors: Michael Stephen Donovan, Huntley, IL (US); Robert Russell Gallucci, Mt. Vernon, IN (US); Roy Ray Odle, Mt. Vernon, IN (US); Kapil Chandrakant Sheth, Evansville, IN (US)

(73) Assignee: SABIC GLOBAL TECHNOLOGIES B.V. (NL)

( * ) Notice: Subject to any disclaimer, the term of this patent is extended or adjusted under 35 U.S.C. 154(b) by 0 days.

(21) Appl. No.: 14/459,543

(22) Filed: Aug. 14, 2014

(65) Prior Publication Data

US 2014/0357796 A1    Dec. 4, 2014

Related U.S. Application Data

(63) Continuation of application No. 11/562,634, filed on Nov. 22, 2006, now abandoned.

(51) Int. Cl.
*C08L 79/08*    (2006.01)

(52) U.S. Cl.
CPC ............. *C08L 79/08* (2013.01); *C08L 2201/08* (2013.01); *C08L 2205/02* (2013.01); *C08L 2205/025* (2013.01); *C08L 2207/04* (2013.01)

(58) Field of Classification Search
None
See application file for complete search history.

(56) References Cited

U.S. PATENT DOCUMENTS

| 2,991,273 A | 7/1961 | Hechelhammer et al. |
|---|---|---|
| 2,999,835 A | 9/1961 | Goldberg |
| 3,028,365 A | 4/1962 | Schnell et al. |
| 3,065,205 A | 11/1962 | Bonner, Jr. |
| 3,148,172 A | 9/1964 | Fox |
| 3,153,008 A | 10/1964 | Fox |
| 3,271,367 A | 9/1966 | Schnell et al. |
| 3,271,368 A | 9/1966 | Goldberg et al. |
| 3,383,092 A | 5/1968 | Cazier |
| 3,671,487 A | 6/1972 | Abolins |
| 3,723,373 A | 3/1973 | Lucas |
| 3,787,364 A | 1/1974 | Wirth et al. |
| 3,803,085 A | 4/1974 | Takehoshi et al. |
| 3,814,869 A | 6/1974 | De Luca |
| 3,825,629 A | 7/1974 | Hofer et al. |
| 3,847,867 A | 11/1974 | Heath et al. |
| 3,847,869 A | 11/1974 | Williams, III |
| 3,850,885 A | 11/1974 | Takekoshi et al. |
| 3,852,242 A | 12/1974 | White |
| 3,855,178 A | 12/1974 | White et al. |
| 3,905,942 A | 9/1975 | Takekoshi et al. |
| 3,917,643 A | 11/1975 | Takekoshi et al. |
| 3,962,175 A | 6/1976 | Hofer et al. |
| 3,972,902 A | 8/1976 | Heath et al. |
| 3,983,093 A | 9/1976 | Williams, III et al. |
| 4,075,163 A | 2/1978 | Hofer et al. |
| 4,154,775 A | 5/1979 | Axelrod |
| 4,175,175 A | 11/1979 | Johnson et al. |
| 4,176,222 A | 11/1979 | Cinderey et al. |
| 4,217,438 A | 8/1980 | Brunelle et al. |
| 4,396,755 A | 8/1983 | Rose |
| 4,398,020 A | 8/1983 | Rose |
| 4,443,591 A | 4/1984 | Schmidt et al. |
| 4,455,410 A | 6/1984 | Giles, Jr. |
| 4,468,506 A | 8/1984 | Holub et al. |
| 4,681,928 A | 7/1987 | Berger et al. |
| 4,689,391 A | 8/1987 | Peters et al. |
| 4,820,781 A * | 4/1989 | Policastro et al. ............ 525/431 |
| 4,835,249 A | 5/1989 | Gallagher et al. |
| 4,847,311 A | 7/1989 | Yamaya et al. |
| 4,910,288 A | 3/1990 | Dellacoletta |
| 4,965,337 A | 10/1990 | Peters et al. |
| 5,079,309 A | 1/1992 | Harris et al. |
| 5,091,028 A | 2/1992 | Yamazaki et al. |
| 5,171,796 A | 12/1992 | Harris et al. |
| 5,229,482 A | 7/1993 | Brunelle |
| 5,254,361 A | 10/1993 | Kawamoto et al. |
| 5,260,407 A | 11/1993 | Saruwatari et al. |
| 5,298,331 A | 3/1994 | Kanakarajan et al. |
| 5,324,475 A | 6/1994 | Okahashi et al. |
| 5,331,063 A | 7/1994 | Pater et al. |
| 5,460,890 A | 10/1995 | Okahashi et al. |
| 5,534,602 A | 7/1996 | Lupinski et al. |
| 5,633,319 A | 5/1997 | Silvi et al. |

(Continued)

FOREIGN PATENT DOCUMENTS

| EP | 1498909 A1 | 1/2005 |
|---|---|---|
| EP | 2006/091481 * | 8/2006 |

(Continued)

OTHER PUBLICATIONS

JP408143667 A with English Abstract; Published Jun. 4, 1996; 10 pages.
International Search Report for International Application No. PCT/US2007/075809; Mailed Jan. 7, 2008; 5 pages.
Written Opinion for International Application No. PCT/US2007/075809; Mailed Jan. 7, 2008; 6 pages.
Iinternational Search Report for International Application No. PCT/US2007/075812; Mailed May 7, 2008; 5 pages.
Written Opinion for International Application No. PCT/US2007/075812; Mailed May 7, 2008; 5 pages.
JP08239645 Abstract; Sep. 17, 1996; 1 page.

(Continued)

*Primary Examiner* — Ana Woodward
(74) *Attorney, Agent, or Firm* — Cantor Colburn LLP; Diderico van Eyl

(57) ABSTRACT

A thermoplastic composition comprises a polymer blend. The polymer blend comprises a first polyimide and a second polyimide. The first polyimide has repeating units derived from a first dianhydride and a first diamine. The second polyimide has repeating units derived from a second dianhydride and a second diamine. Either the first dianhydride and the second dianhydride are the same or the first diamine and the second diamine are the same.

31 Claims, 1 Drawing Sheet

(56) References Cited

U.S. PATENT DOCUMENTS

| | | | |
|---|---|---|---|
| 5,705,574 | A | 1/1998 | Lubowitz et al. |
| 5,830,974 | A | 11/1998 | Schmidhauser et al. |
| 6,103,806 | A | 8/2000 | Kido et al. |
| 6,187,874 | B1 | 2/2001 | Yoshioka et al. |
| 6,458,912 | B1 | 10/2002 | Kuroki et al. |
| 6,476,177 | B2 | 11/2002 | Auman et al. |
| 6,548,180 | B2 | 4/2003 | Yamamoto et al. |
| 6,849,706 | B1 | 2/2005 | Brunelle et al. |
| 6,919,422 | B2 | 7/2005 | Gallucci et al. |
| 2004/0161711 | A1 | 8/2004 | Rushkin et al. |
| 2004/0249117 | A1 | 12/2004 | Acar et al. |
| 2004/0260055 | A1 | 12/2004 | Gallucci et al. |
| 2005/0070684 | A1 | 3/2005 | Gallucci et al. |
| 2005/0112362 | A1 | 5/2005 | Yen-huey et al. |
| 2005/0149390 | A1 | 7/2005 | Scholl et al. |
| 2007/0066740 | A1 | 3/2007 | Odle et al. |

FOREIGN PATENT DOCUMENTS

| | | |
|---|---|---|
| WO | 2006/091481 | 8/2006 |
| WO | 2006091481 A1 | 8/2006 |

OTHER PUBLICATIONS

JP58007449 Abstract; Jan. 17, 1983; 1 page.
International Search Report for International Application No. PCT/US2007/075993, mailed Nov. 13, 2007, 5 pages.
Written Opinion for International Search Report for International Application No. PCT/US2007/075993, mailed Nov. 13, 2007, 6 pages.
ASTM D638, Standard Test Method for Tensile Properties of Plastics, 15 pages.
ASTM D648, Standard Test Method for Deflection Temperature of Plastics Under Flexural Load in the Edgewise Position, 12 pages.
Chao, A P NMR study of poly(phenylene oxide) (PPO)(1) resin's hydroxyl end groups, Polymer Bulletin 17, 1987, 397-401.
Kreuz, et al., Studies of Thermal Cyclizations of Polyamic Acids and Tertiary Amine salts, Journal of Polymer Science, Part A-1, 1966, vol. 4, 2607-2616.
Kim, et al., Kinetic and Mechanistic Investigations of the Formation of Polyimides under Homogenous Conditions, Macromolecules, 1993, vol. 26, 1344-1358.
Chan, et al, Facile Quantative Analysis of Hydroxyl End Groups of Poly(2,6-dimethyl-1,4-phenylene oxideys by P NMR Spectroscopy, Macromolecules, 1994, 27, 6371-6375.

* cited by examiner

POLYIMIDE RESIN COMPOSITIONS

CROSS REFERENCE TO RELATED APPLICATIONS

This application is a continuation of pending U.S. patent application Ser. No. 11/562,634 filed on Nov. 22, 2006, which is incorporated herein by reference.

BACKGROUND OF THE INVENTION

Polyimide compositions, and in particular, polyimide compositions comprising two polymers are disclosed herein.

Polymer blends are widely employed in a range of applications. For example, substitution of metal parts with parts made from plastic materials (polymer compositions) results in parts having lighter weight and similar or improved performance properties. In many applications, such as parts used under an automobile hood, plastic materials with a high heat resistance are required. Frequently though, plastic materials having a high heat resistance are difficult to mold. Blending polymers is one approach to achieving a thermoplastic composition with a desired set of physical properties such as high heat resistance, melt viscosity, and processability. Polymer blends may comprise miscible polymers, immiscible polymers or a combination of miscible and immiscible polymers. Blends comprising immiscible polymers have two or more phases and such blends may be compatible or incompatible. Incompatible blends of immiscible polymers can suffer from phase separation as demonstrated by delamination or the formation of skin-core layered structures during polymer processing operations, especially injection molding. The term, "delamination," as used when referring to such materials, describes visually observed separation of a surface layer giving a flaking or onion skin effect. Incompatibility may also result in poor mechanical properties and marginal surface appearance (streaking, pearlescence, etc.). Compatible blends of immiscible polymers typically do not show any delamination and can result in acceptable end-use properties.

Miscible polymer blends, on the other hand, may offer desirable end-use properties and the advantage of tailoring product properties intermediate of the individual components across the miscible composition range. Miscible blends do not suffer from delamination and generally have consistent physical properties.

So while a miscible blend of two polymers is generally desirable it can be difficult to achieve. Blends of two polymers of a same or similar class might be expected to have a better chance of miscibility. However, polymers from the same class are frequently immiscible and form multiphasic compositions. For example, ACUDEL 2000 from Solvay is an immiscible blend of two polysulfones—PPSU and PSU. In addition, many such examples of immiscible blends of polymers in the same class exist in the literature. Thus, polymer miscibility is difficult to predict, even within the same class of polymers.

For the foregoing reasons there remains an unmet need for non-delaminated polymer blends, e.g., blends essentially free of delamination, which are either miscible blends or immiscible, but nonetheless compatible, blends. More particularly, there remains an unmet need to develop blends having high heat resistance, and methods of forming such polymer blends.

BRIEF DESCRIPTION OF THE INVENTION

The invention includes non-delaminated thermoplastic compositions comprising a polymer blend wherein the polymer blend comprises a first polyimide and a second polyimide and any reaction products thereof. The first polyimide comprises structural units derived from a first dianhydride and a first diamine. The second polyimide comprises structural units derived from a second dianhydride and a second diamine. The dianhydrides and diamines are chosen such that the first dianhydride and the second dianhydride are the same or the first diamine and the second diamine are the same.

In some embodiments the first polyimide is present in an amount of 50 to 99 weight percent, based on the total weight of the polymer blend, and the second polyimide is present in an amount of 1 to 50 weight percent, based on the total weight of the polymer blend. The polymer blend has a single glass transition temperature.

In some embodiments the polymer blend comprises 50 to 95 weight percent of the first polyimide, 5 to 50 weight percent of the second polyimide, and 0 to 70 weight percent of a component selected from the group consisting of fillers, reinforcements, additives, and combinations thereof. The first polyimide, the second polyimide, and the component are present at a total weight percent of 100. The polymer blend has greater than one glass transition temperature.

In some embodiments the first polyimide comprises structural units derived from a oxy diphthalic anhydride and a diamino diaryl sulfone; and the second polyimide comprises structural units derived from a bis-phenol A dianhydride and a diamino diaryl sulfone.

Also disclosed herein are compositions of matter comprising a non-delaminated article derived from the above described compositions.

DETAILED DESCRIPTION OF THE INVENTION

Figure 1:
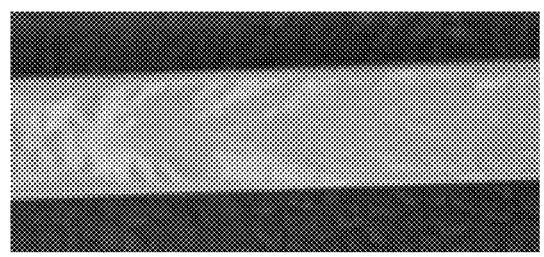
FIG. 1 is a picture of an injection molded bar showing delamination.

The invention is based on the unexpected discovery that it is now possible to form non-delaminated compositions that are derived from (a) a first polyimide comprising structural units derived from a dianhydride and a diamine (b) a second polyimide comprising structural derived from a dianhydride and a diamine wherein the first dianhydride and the second dianhydride are the same or the first diamine and the second diamine are the same. Surprisingly, the compositions (and articles derived from the compositions) can overcome the problem of delamination typically found in immiscible, incompatible blends.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations.

The terms "first," "second," and the like, "primary," "secondary," and the like, as used herein do not denote any order, quantity, or importance, but rather are used to distinguish one element from another. The terms "a" and "an" do not denote a limitation of quantity, but rather denote the presence of at least one of the referenced item. "Optional" or "optionally"

means that the subsequently described event or circumstance may or may not occur, and that the description includes instances where the event occurs and instances where it does not. The endpoints of all ranges directed to the same component or property are inclusive of the endpoint and independently combinable. Reference throughout the specification to "one embodiment," "another embodiment," "an embodiment," "some embodiments," and so forth, means that a particular element (e.g., feature, structure, property, and/or characteristic) described in connection with the embodiment is included in at least one embodiment described herein, and may or may not be present in other embodiments. In addition, it is to be understood that the described element(s) may be combined in any suitable manner in the various embodiments.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

The term "alkyl" is intended to include both $C_{1-30}$ branched and straight-chain, unsaturated aliphatic hydrocarbon groups having the specified number of carbon atoms. Examples of alkyl include, but are not limited to, methyl, ethyl, n-propyl, i-propyl, n-butyl, s-butyl, t-butyl, n-pentyl, s-pentyl, n- and s-hexyl, n- and s-heptyl, and, n- and s-octyl. The term "aryl" is intended to mean an aromatic moiety containing the specified number of carbon atoms, such as, but not limited to phenyl, tropone, indanyl or naphthyl.

All ASTM tests are based on the 2003 edition of the Annual Book of ASTM Standards unless otherwise indicated.

The term "polymer blend" as used herein means a macroscopically homogeneous mixture of two or more different polymers. The term "miscible blend" describes a polymer blend having a single glass transition temperature ($T_g$) and a monophasic resin morphology as determined by transmission electron microscopy at a magnification of fifteen thousand (15,000). "Delamination" describes the separation of a surface layer from the body of an article molded from a polymer composition. The presence or absence of delamination can be determined by visual inspection (20/20 vision) at a distance of one half (½) meter as described in greater detail below.

The term "compatibility" refers to the capability of the individual polymers in an immiscible polymer blend to exhibit interfacial adhesion. A "compatible polymer blend" is an immiscible polymer blend that exhibits macroscopically uniform physical properties throughout its whole volume, has more than one glass transition temperature ($T_g$), and shows multiphasic resin morphologies when viewed by electron microscopy as described above, but shows no delamination.

The term "non-delaminated" refers to the property of a composition or an article derived from the composition, in which the article or the composition does not exhibit visually observed separation of a surface layer showing a flaking or onion skin effect. A non-delaminated article may also be referred to herein as "essentially free from delamination."

Figure 2:
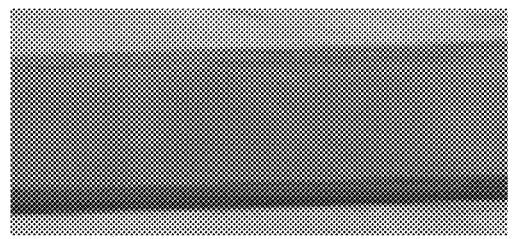
FIG. 2 is a picture of an injection molded bar without delamination.

"Essentially free from delamination" is defined as showing no delamination by visual inspection. In one embodiment, the specimen used for inspection is a molded bar. A specimen showing delamination is shown in FIG. 1. A specimen essentially free from delamination is shown in FIG. 2. "Visual inspection" is determined by unaided vision (e.g., 20/20 vision in the absence of any magnifying device with the exception of corrective lenses necessary for normal eyesight) at a distance of one half (½) meter.

Miscibility can be composition dependent. Miscibility can also be dependent on the particular dianhydrides and/or diamines used to form the structural units of the first and second polyimides. In one embodiment, the first polyimide and the second polyimide form a miscible polymer blend. The polymer blend has a single glass transition temperature and shows only one phase by transmission electron microscopy. In another embodiment, the first polyimide and the second polyimide form a compatible polymer blend. The compatible polymer blend shows two phases by transmission electron microscopy, has greater than one glass transition temperature and articles formed by injection molding a thermoplastic composition comprising the compatible polymer blend show essentially no delamination after aging at 280° C. for 240 hours.

The first and second polyimides comprise structural units derived from a dianhydride and a diamine. Exemplary dianhydrides have the formula (I)

(I)

wherein V is a tetravalent linker selected from the group consisting of substituted or unsubstituted, saturated, unsaturated or aromatic monocyclic and polycyclic groups having 5 to 50 carbon atoms, substituted or unsubstituted alkyl groups having 1 to 30 carbon atoms, substituted or unsubstituted alkenyl groups having 2 to 30 carbon atoms and combinations comprising at least one of the foregoing linkers. Suitable substitutions and/or linkers include, but are not limited to, carbocyclic groups, aryl groups, ethers, sulfones, sulfides amides, esters, and combinations comprising at least one of the foregoing. Exemplary linkers include, but are not limited to, tetravalent aromatic radicals of formula (II), such as:

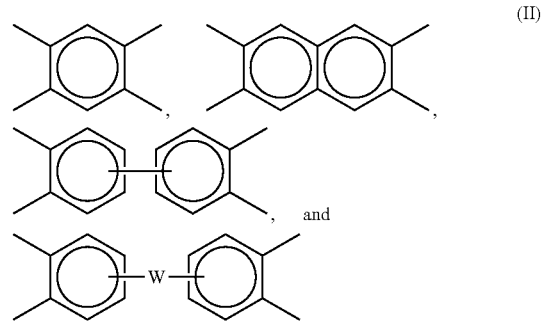

(II)

wherein W is a divalent moiety such as —O—, —S—, —C(O)—, —SO$_2$—, —SO—, —C$_y$H$_{2y}$— (y being an integer of 1 to 20), and halogenated derivatives thereof, including perfluoroalkylene groups, or a group of the formula —O—Z—O— wherein the divalent bonds of the —O— or the —O—Z—O— group are in the 3,3', 3,4', 4,3', or the 4,4' positions, and wherein Z includes, but is not limited to, divalent moieties of formula (III)

(III)

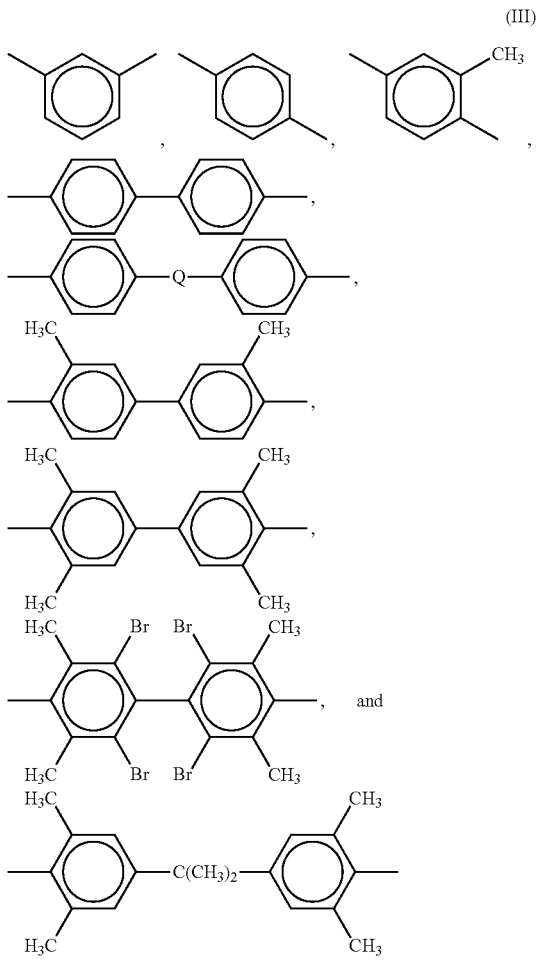

wherein Q includes, but is not limited to, a divalent moiety comprising —O—, —S—, —C(O)—, —SO$_2$—, —SO—, —C$_y$H$_{2y}$— (y being an integer from 1 to 20), and halogenated derivatives thereof, including perfluoroalkylene groups. In some embodiments the tetravalent linker V is free of halogens.

In one embodiment, the dianhydride comprises an aromatic bis(ether anhydride). Examples of specific aromatic bis(ether anhydride)s are disclosed, for example, in U.S. Pat. Nos. 3,972,902 and 4,455,410. Illustrative examples of aromatic bis(ether anhydride)s include: 2,2-bis[4-(3,4-dicarboxyphenoxy)phenyl]propane dianhydride (bisphenol-A dianhydride); 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride and 4-(2,3-dicarboxyphenoxy)-4'-(3,4-dicarboxyphenoxy)diphenyl sulfone dianhydride, as well as mixtures comprising at least two of the foregoing.

The bis(ether anhydride)s can be prepared by the hydrolysis, followed by dehydration, of the reaction product of a nitro substituted phenyl dinitrile with a metal salt of dihydric phenol compound in the presence of a dipolar, aprotic solvent.

A chemical equivalent to a dianhydride may also be used. Examples of dianhydride chemical equivalents include tetrafunctional carboxylic acids capable of forming a dianhydride and ester or partial ester derivatives of the tetra functional carboxylic acids. Mixed anhydride acids or anhydride esters may also be used as an equivalent to the dianhydride. As used throughout the specification and claims "dianhydride" will refer to dianhydrides and their chemical equivalents.

In some embodiments the dianhydride is selected from the groups consisting of bisphenol-A dianhydride, oxydiphthalic anhydride (ODPA) and combinations thereof. Oxydiphthalic anhydride has the general formula (IV):

(IV)

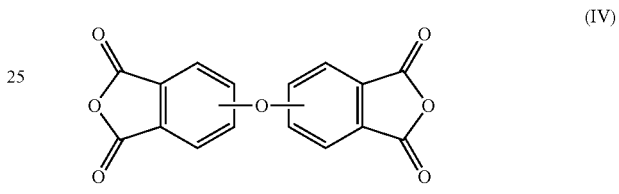

and derivatives thereof as further defined below.

The oxydiphthalic anhydrides of formula (IV) include 4,4'-oxybisphthalic anhydride, 3,4'-oxybisphthalic anhydride, 3,3'-oxybisphthalic anhydride, and any mixtures thereof. For example, the oxydiphthalic anhydride of formula (IV) may be 4,4'-oxybisphthalic anhydride having the following formula (V):

(V)

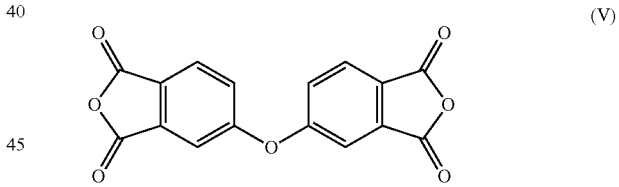

The term oxydiphthalic anhydrides includes derivatives of oxydiphthalic anhydrides which may also be used to make the polyimide. Examples of oxydiphthalic anhydride derivatives which can function as a chemical equivalent for the oxydiphthalic anhydride in polyimide forming reactions include oxydiphthalic anhydride derivatives of the formula (VI):

(VI)

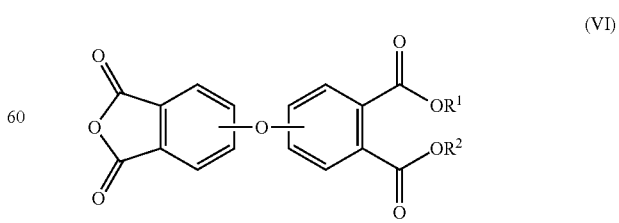

wherein R$^1$ and R$^2$ of formula VIII can be, independently at each occurrence, any of the following: hydrogen; a C$_1$-C$_8$ alkyl group; an aryl group. $R^1$ and $R^2$ can be the same or different to produce an oxydiphthalic anhydride acid, an oxydiphthalic anhydride ester, and an oxydiphthalic anhydride acid ester.

Derivatives of oxydiphthalic anhydrides may also be of the following formula

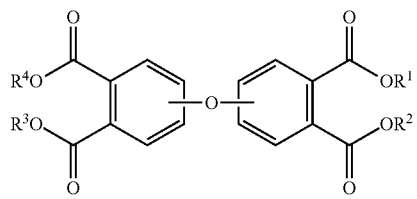

(VII)

wherein $R^1$, $R^2$, $R^3$, and $R^4$ of formula (VII) can be, independently at each occurrence, any of the following: hydrogen, a $C_1$-$C_8$ alkyl group, an aryl group. $R^1$, $R^2$, $R^3$, and $R^4$ can be the same or different to produce an oxydiphthalic acid, an oxydiphthalic ester, and an oxydiphthalic acid ester.

Useful diamines have the formula:

(VIII)

wherein $R^{10}$ is a substituted or unsubstituted divalent organic moiety such as: an aromatic hydrocarbon moiety having 6 to 20 carbons and halogenated derivatives thereof; a straight or branched chain alkylene moiety having 2 to 20 carbons; a cycloalkylene moiety having 3 to 20 carbon atoms; or a divalent moiety of the general formula (IX)

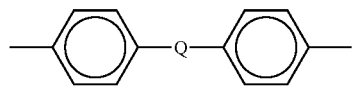

(IX)

wherein Q is defined as above. Examples of specific organic diamines are disclosed, for example, in U.S. Pat. Nos. 3,972,902 and 4,455,410. Exemplary diamines include ethylenediamine, propylenediamine, trimethylenediamine, diethylenetriamine, triethylenetertramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis(3-aminopropyl)amine, 3-methoxyhexamethylenediamine, 1,2-bis(3-aminopropoxy) ethane, bis(3-aminopropyl) sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(2-chloro-4-amino-3,5-diethylphenyl) methane, bis(4-aminophenyl) propane, 2,4-bis(p-amino-t-butyl) toluene, bis(p-amino-t-butylphenyl) ether, bis(p-methyl-o-aminophenyl)benzene, bis(p-methyl-o-aminopentyl)benzene, 1,3-diamino-4-isopropylbenzene, bis(4-aminophenyl) sulfide, bis(4-aminophenyl) sulfone, bis (4-aminophenyl) ether and 1,3-bis(3-aminopropyl)tetramethyldisiloxane. Mixtures of these compounds may also be used. In one embodiment the diamine is an aromatic diamine, or, more specifically, m-phenylenediamine, p-phenylenediamine, sulfonyl dianiline, and mixtures thereof.

In some embodiments the diamine is selected from the group consisting of m-phenylenediamine, p-phenylenediamine, diamino diaryl sulfones and combinations thereof. Diamino diaryl sulfones (DAS) have the general formula (X):

(X)

wherein $Ar^1$ and $Ar^2$ independently are an aryl group containing a single or multiple rings. Several aryl rings may be linked together, for example through ether linkages, sulfone linkages or more than one sulfone linkages. The aryl rings may also be fused. In one embodiment $Ar^1$ and $Ar^2$ independently comprise 5 to 12 carbons. In one embodiment $Ar^1$ and $Ar^2$ are both phenyl groups.

The first and second polyimides have a weight average molecular weight (Mw) of 5,000 to 100,000 grams per mole (g/mole) as measured by gel permeation chromatography (GPC). In some embodiments the Mw can be 10,000 to 80,000. The molecular weights as used here referin to the absolute weight averaged molecular weight (Mw). The first and second polyimides may have an intrinsic viscosity greater than or equal to 0.2 deciliters per gram (dl/g) as measured in m-cresol at 25° C. Within this range the intrinsic viscosity may be 0.35 to 1.0 dl/g, as measured in m-cresol at 25° C.

In some embodiments the first polyimide has a glass transition temperature ($T_g$) of 200° C. to 500° C. as measured using differential scanning calorimetry (DSC) as per ASTM test D3418. In some embodiments the first polyimide has a glass transition temperature ($T_g$) of 240 to 350° C.

In some embodiments the second polyimide has a glass transition temperature ($T_g$) of 150° C. to 400° C. as measured using differential scanning calorimetry (DSC) as per ASTM test D3418. In some embodiments the second polyimide has a glass transition temperature ($T_g$) of 200 to 300° C.

In some embodiments the first polyimide comprises structural units derived from oxydiphthalic anhydride (ODPA) and diamino diaryl sulfone (DAS) and the second polyimide comprises structural units derived from bisphenol-A dianhydride (BPADA) and diamino diarylsulfone (DAS).

The polyimide polymers described above may be made using any suitable method known in the art. In one embodiment, a method using a highly polar solvent that dissolves both the reactant monomers and the resultant polymers can be used. Solvents such as dimethyl formamide (DMF), dimethyl acetamide (DMAC), N-methyl pyrrolidinone (NMP), hexamethyl phosphoramide (HMPA) and dimethyl sulfoxide (DMSO) can be used in this method. The resultant polymers are totally dissolved and can be isolated from solution by removal of solvent as part of a film casting or other evaporative process or by precipitation using an anti-solvent such as methanol.

In another embodiment, a method as described in U.S. Pat. No. 4,835,249 can be used to make the above polyimides. In this method, reactant monomers are dissolved in a solvent and then polymerized to an extent where the polymer precipitates from solution and can eventually be isolated by filtration or other related separation technique.

In yet another embodiment, polyimides can be made using a process comprising stirring a diamine and a dianhydride in a solvent to form a slurry, heating the slurry to a temperature sufficient for the diamine and dianhydride to react wherein the temperature is below the melting point of the dianhydride, below the melting point of the diamine, or below the melting points of the dianhydride and diamine, and reacting the diamine and dianhydride to form a polyimide having sufficient molecular weight to precipitate from the solvent.

In the above process, it is important that the reaction temperature is kept below the melting point of the minimally soluble monomers so that the polymers precipitate as fine powder from the slurry that is easily stirred. In some embodiments, when sufficient monomers have been consumed in the polymerization to prevent agglomeration of the polyimide, for instance equal to or greater than 50 weight % of the initial charge of the monomers, the temperature of the slurry may be increased above the melting point temperature of the minimally soluble monomer to drive the imidization reaction to completion if so desired. In some embodiments it may be desirable to have higher incorporation of the minimally soluble monomer into the polymer, such as equal to or greater than 75 weight %, or, more specifically, equal to or greater than 95 weight %, or, even more specifically, 100 weight % incorporation, before raising the temperature above the melting point of the minimally soluble monomer.

It can also be useful to remove water or other volatile by-products from the reaction mixture by distillation or other means. In one embodiment azeotropic distillation of water is employed. In some embodiments water can be removed by chemical absorption using, for example, molecular sieves. In other instances water can be removed using a stream of a gas, for example nitrogen, passing over or through the reaction mixture. In addition, a combination of two or more water removal methods may be employed.

In one embodiment, the polymerization is conducted entirely below the melting point of the minimally soluble monomer(s). This may be useful when the boiling point temperature of the solvent and the melting point of the minimally soluble monomer(s) are greater than 100° C., to allow removal of water from the polymerization reaction at atmospheric pressure.

It can be useful to conduct the polymerization under pressure, for example at 1 to 300 pounds per square inch (psi) (21.1 kilograms force per square centimeter (kgf/cm$^2$)), or, more specifically, 1 psi (0.070 kgf/cm$^2$) to 100 psi (7.0 kgf/cm$^2$). This can be done for a variety of reasons, one being to raise reaction temperature and increase the rate of imidization. In order to prevent sticking or clumping of the precipitated polymer it is still important to maintain temperature below the melting point of the minimally soluble monomer(s) even when pressure is increased. In some embodiments, it may be useful to remove water from the reaction while pressure is maintained at atmospheric pressure. In some embodiments it can be useful to remove water in a multi step process employing pressures greater than or equal to atmospheric pressure.

After the consumption of equal to or greater than 50 weight percent (wt %) of the initial charge of the monomers it can be useful in some embodiments to isolate the precipitated polymer. In other embodiments the precipitated polymer may be isolated when equal to or greater than 90 wt % of the initial charge of monomers are consumed. This can be done using a variety of methods, for example, filtration, centrifugation, flotation, spray drying, solvent evaporation, solvent distillation, freeze-drying, and combinations comprising one or more of the foregoing methods. In some embodiments, filtration, spray drying, solvent evaporation, or distillation or a combination of two or more of the foregoing methods maybe employed. In other embodiments an extrusion devolatilization process can be used to isolate the polyimide from the slurry. In some embodiments equal to or greater than 95 wt % of the isolated precipitated polyimide, based on the total weight of the isolated precipitated polyimide, passes through a 2 millimeter (mm) mesh screen. In some embodiments the isolated precipitated polyimide is a free flowing powder with an average particle size of 10 to 5000 micrometers. Regardless of the isolation method low levels of solvent generally remain in the polyimide, typically on the order of parts per million or on the order of parts per million.

The solvent used to form the slurry is chosen such that one or more of the initial monomers is minimally soluble. "Minimally soluble" is defined as 1 to 50 wt % of the monomer is undissolved at the start of the reaction (at the initial reaction conditions). In addition, the solvent should be chosen such that the resultant polymer is largely insoluble, that is to have a polymer solubility of less than or equal to 10 wt %, or, even more specifically, less than or equal to 5 wt %, or, even more specifically, less than or equal to 1 wt %. In some embodiments the solvent comprises an aprotic polar solvent. In some embodiments, the solvent is insoluble in water, that is less than or equal to 5 wt %, or, more specifically, less than or equal to 1 wt %, based on the total amount of solvent, of the solvent dissolves in an equal amount of water at room temperature. In some embodiments, the solvent has a high auto ignition temperature, for example greater than or equal to 70° C., to reduce the potential fire hazard during the process and during any subsequent isolation.

In addition, a solvent free of nitrogen atoms, phosphorus atoms, sulfur atoms or a combination comprising two or more of the foregoing may be useful in some embodiments. Solvents without these more polar atoms may be easier to remove from the polymer and being less effective solvents are more likely to have monomers and polymers that are minimally soluble or insoluble.

Examples of useful solvents include halogenated aromatics, such as chlorobenzene, dichlorobenzene, trichlorobenzene and bromobenzene; aryl ethers such as phenetole, anisole and veratrole; alky\aromatics such as xylenes and toluene; nitro aromatics such as nitrobenzene; polyaryl species such as naphthylene and alkyl substituted fused aromatic systems; aryl sulfone; high molecular weight alkane compounds such as mineral oils; and combinations comprising one or more of the foregoing solvents. In some embodiments the solvent or combination of solvents has an atmospheric boiling point of 150 to 250° C.

The reaction may be run at any level of reactants versus solvent. In some instances the weight % solids can be 5 to 50% by weight of reactants to solvent at the start of the polymerization reaction. In other instances, concentrations of 15 to 40% may be useful. In still other instances higher concentrations of reactants to solvent may be used to gain reactor efficiency.

Polyimide may be made using the precipitative process by reaction of more or less equal molar amounts of dianhydride (or chemical equivalent of a dianhydride) with a diamine. In some embodiments the amount of dianhydride and diamine differ by less than 5 mole %; this helps to give polymers of sufficient weight average molecular weight (Mw), for example greater than or equal to 5,000 g/mol, to precipitate from the reaction medium and have useful mechanical properties such as stiffness, impact strength and resistance to tearing or cracking.

A chain-terminating agent may be employed to control the molecular weight of the final polymer product. The chain terminating agent may be partially or totally soluble in the starting reaction mixture. Mono-amines, mono-anhydrides such as phthalic anhydride, or combinations of mono-amines and mono-anhydrides may be used. The amount of mono-amine, mono-anhydride, or mixture thereof, may be any amount that provides the desired molecular weight of the polyimide. In some embodiments the amount of mono-amine, mono-anhydride, or combination thereof may be 0.1 to 15.0 mole %, or, more specifically, 0.1 to 5.0 mole %, based on the total monomer content.

Mono-amines that can be used to end cap the polyimide may have from 3 to 24 carbon atoms, may be aliphatic or aromatic, and may include, but are not limited to, substituted or unsubstituted anilines, substituted or unsubstituted naphthyl amines and substituted or unsubstituted heteroaryl amines. The mono-amines may have additional functionality, for instance, aryl groups, alkyl groups, aryl-alky groups, sulfone groups, ester groups, amide groups, halogens, alkyl or aryl halogen groups, alkyl ether groups, aryl ether groups, or aryl keto groups. Some particular substituents on mono-amines include, but are not limited to, halo and perfluoroalkyl. The attached functionality should not impede the function of the mono-amine in controlling polyimide molecular weight.

Mono-anhydrides may also have 3 to 24 carbon atoms, may be aliphatic or aromatic, and include, but are not limited to, substituted or unsubstituted phthalic anhydrides for instance, phthalic anhydride, chloro phthalic anhydride, methoxy phthalic anhydride, phenoxy phthalic anhydride, and naphthyl anhydrides. End capping agents may also be chosen from the group consisting of 1,2-dicarboxylic acids, 1,2-dicarboxylic esters, 1,2-dicarboxylic ester acids and mixtures comprising one or more of the foregoing.

The compositions described herein may further contain an additional component such as fillers, reinforcements, additives, and combinations thereof. The additional component may be present in an amount of 0 to 70 wt %, based on the combined weight of the first polyimide, second polyimide and additional component. Exemplary fillers and reinforcements include fiber glass, milled glass, glass beads, flake and the like. Minerals such as talc, wollastonite, mica, kaolin or montmorillonite clay, silica, quartz, barite, and combinations of two or more of the foregoing may be added. The compositions can comprise inorganic fillers, such as, for example, carbon fibers and nanotubes, metal fibers, metal powders, conductive carbon, and other additives including nano-scale reinforcements as well as combinations of inorganic fillers.

Other additives include, UV absorbers; stabilizers such as light stabilizers and others; lubricants; plasticizers; pigments; dyes; colorants; anti-static agents; foaming agents; blowing agents; metal deactivators, and combinations comprising one or more of the foregoing additives. Antioxidants can be compounds such as phosphites, phosphonites and hindered phenols or mixtures thereof. Phosphorus containing stabilizers including triaryl phosphite and aryl phosphonates are of note as useful additives. Difunctional phosphorus containing compounds can also be employed. Stabilizers may have a molecular weight greater than or equal to 300. In some embodiments, phosphorus containing stabilizers with a molecular weight greater than or equal to 500 are useful. Phosphorus containing stabilizers are typically present in the composition at 0.05-0.5% by weight of the formulation. Flow aids and mold release compounds are also contemplated.

In another embodiment, the compositions may further include at least one polymer. Examples of such polymers include and are not limited to PPSU (polyphenylene sulfone), PEI (poly(ether imide)), PSU (polysulfone), PC (polycarbonate), PPO (polyphenylene ether), PMMA (poly methyl methacrylate), ABS, (acrylonitrile butadiene styrene), PS (polystyrene) and, PVC (polyvinylchloride), PFA (per fluoro aalkoxy alkane), MFA (co-polymer of TFE tetra fluoro ethylene and PFVE perfluorinated vinyl ether), FEP (Fluorinated ethylene propylene polymers), PPS (poly(phenylene sulfide), PEK (poly(ether ketone), PEEK (poly(ether-ether ketone), ECTFE (ethylene chloro trifluoro ethylene), PVDF (polyvinylidene fluoride), PTFE (polytetrafluoroethylene), PET (polyethylene terephthalate), POM (polyacetal), PA (polyamide), UHMW-PE (ultra high molecular weight polyethylene), PP (polypropylene), PE (polyethylene), HDPE (high density polyethylene), LDPE (low density polyethylene), PBI (polybenzimidizole) and PAI (poly(amide-imide), poly (ether sulfone), poly(aryl sulfone), polyphenylenes, polybenzoxazoles, polybenzthiazoles, as well as blends and co-polymers thereof.

In one embodiment, a thermoplastic composition consists essentially of a first polyimide comprising structural units derived from oxydiphthalic anhydride and diamino diaryl sulfone; and a second polyimide comprising structural units derived from bisphenol-A dianhydride and diamino diaryl sulfone. This composition is essentially free from delamination after aging at 280° C. for 240 hours. As used herein "consisting essentially of" allows for the inclusion of additives typically used in thermoplastic compositions but excludes the inclusion of resins and materials that would alter the miscibility and resin morphology.

The compositions may be made by any suitable method. For instance, compositions can be made by melt mixing (compounding) the first polyimide, the second polyimide, and optional additives at a temperature greater than the melt temperature of the first and second polyimides but less than their degradation temperatures. The compositions may be made by any suitable device such as twin screw extruder at a suitable temperature, e.g., 250° C. to 450° C. Alternatively, a single-screw extruder or a helicone-type mixer may be used. Optionally, the device may have a vacuum vent.

The first polyimide may be present in an amount of 1 weight percent (wt %) to 99 wt %, or, more specifically, 10 wt % to 90 wt %, based on the combined weight of the first polyimide and the second polyimide. Additionally, the first polyimide may be present in an amount of 50 wt % to 95 wt %, or, more specifically, 50 wt % to 90 wt %. The second polyimide may be present in an amount of 1 wt % to 99 wt %, or, more specifically, 10 wt % to 90 wt %, based on the combined weight of the first polyimide and the second polyimide. Additionally, the second polyimide may be present in an amount of 5 to 50 wt %, or, more specifically, 10 to 50 weight percent.

The compositions can be formed into articles by any number of methods. Preferred methods include, for example, injection molding, blow molding, compression molding, profile extrusion, sheet or film extrusion, sintering, gas assist molding, structural foam molding and thermoforming. Examples of such articles include, but are not limited to, membranes, tubing, composites, semi-conductor process tools, wire coatings and jacketing, fluid handling components, cookware, food service items, medical devices, trays, plates, handles, helmets, animal cages, electrical connectors, enclosures for electrical equipment, engine parts, automotive engine parts, bearings, lighting sockets and reflectors, electric motor parts, power distribution equipment, communication equipment, computers and the like, including devices that have molded in snap fit connectors. The blends can also be used as fibers. In addition the blends can be used as coatings, for example powder coatings.

Compositions discussed herein may be converted to articles using common thermoplastic processes such as film and sheet extrusion. Film and sheet extrusion processes may include and are not limited to melt casting, blown film extrusion and calendering. Films may have a thickness of 0.1 to 1000 micrometers in some instances. Co-extrusion and lamination processes may be employed to form composite multilayer films or sheets. Single or multiple layers of coatings may further be applied to the single or multi-layer substrates to impart additional properties such as scratch resistance, ultra violet light resistance, aesthetic appeal, etc. Coatings may be applied through standard application techniques such as rolling, spraying, dipping, brushing, or flow coating. Film and sheet may alternatively be prepared by casting a solution or suspension of the composition in a suitable solvent onto a substrate, belt or roll followed by removal of the solvent. Films may also be metallized using standard processes such as sputtering, vacuum deposition and lamination with foil.

Oriented films may be prepared through blown film extrusion or by stretching cast or calendered films in the vicinity of the thermal deformation temperature using conventional stretching techniques. For instance, a radial stretching pantograph may be employed for multi-axial simultaneous stretching; an x-y direction stretching pantograph can be used to simultaneously or sequentially stretch in the planar x-y directions. Equipment with sequential uniaxial stretching sections can also be used to achieve uniaxial and biaxial stretching, such as a machine equipped with a section of differential speed rolls for stretching in the machine direction and a tenter frame section for stretching in the transverse direction Compositions discussed herein may be converted to multiwall sheet comprising a first sheet having a first side and a second side, wherein the first sheet comprises a thermoplastic polymer, and wherein the first side of the first sheet is disposed upon a first side of a plurality of ribs; and a second sheet having a first side and a second side, wherein the second sheet comprises a thermoplastic polymer, wherein the first side of the second sheet is disposed upon a second side of the plurality of ribs, and wherein the first side of the plurality of ribs is opposed to the second side of the plurality of ribs.

The films and sheets described above may further be thermoplastically processed into shaped articles via forming and molding processes including but not limited to thermoforming, vacuum forming, pressure forming, injection molding and compression molding. Multi-layered shaped articles may also be formed by injection molding a thermoplastic resin onto a single or multi-layer film or sheet substrate as described below:

1) Providing a single or multi-layer thermoplastic substrate having optionally one or more colors on the surface, for instance, using screen printing of a transfer dye.

2) Conforming the substrate to a mold configuration such as by forming and trimming a substrate into a three dimensional shape and fitting the substrate into a mold having a surface which matches the three dimensional shape of the substrate.

3) Injecting a thermoplastic resin into the mold cavity behind the substrate to (i) produce a one-piece permanently bonded three-dimensional product or (ii) transfer a pattern or aesthetic effect from a printed substrate to the injected resin and remove the printed substrate, thus imparting the aesthetic effect to the molded resin.

Those skilled in the art will also appreciate that common curing and surface modification processes including and not limited to heat-setting, texturing, embossing, corona treatment, flame treatment, plasma treatment and vacuum deposition may further be applied to the above articles to alter surface appearances and impart additional functionalities to the articles. Accordingly, another embodiment of the invention relates to articles, sheets and films prepared from the compositions above.

The physical properties of compositions according to the invention, and articles derived from the compositions, are useful and can vary. For instance, in one embodiment the first polyimide and the second polyimide form a miscible polymer blend. The polymer blend has a single glass transition temperature and shows only one phase by transmission electron microscopy. When the polymer blend has a single glass transition temperature, the glass transition temperature can be greater than or equal to 150° C., or, more specifically, greater than or equal to 175° C., or, even more specifically, greater than or equal to 200° C. The glass transition temperature can be less than or equal to 600° C.

In another embodiment, the first polyimide and the second polyimide form a compatible polymer blend. The polymer blend has greater than one glass transition temperature and shows more thane one phase by transmission electron microscopy. When the polymer blend has two glass transition temperatures, the lowest glass transition temperature is greater than or equal to 150° C., or, more specifically, greater than or equal to 175° C., or, even more specifically, greater than or equal to 200° C. The lowest glass transition temperature can be less than or equal to 600° C.

In some embodiments the polymer blend has a melt viscosity of 50 to 20,000 Pascal-seconds at 380° C. as measured by ASTM method D3835 using a capillary rheometer with a shear rate of 100 to 10,000 l/sec. Within this range the melt viscosity can be greater than or equal to 100, or, more specifically, greater than or equal to 200. Also within this range the melt viscosity can be less than or equal to 15,000, or, more specifically, less than or equal to 10,000 Pascal-seconds.

In another embodiment, the composition can have heat deflection temperature (HDT) of greater than or equal to 120° C., according to ASTM D648. In one embodiment, compositions can have an HDT of 150° C. to 400° C., according to ASTM D648. In another embodiment, the composition can have a tensile strength greater than or equal to 70 megaPascals (MPa) according to ASTM D638. In one embodiment, the compositions and articles can have a tensile strength of 70 MPa to 500 MPa. The coefficient of thermal expansion of the compositions can vary. In one embodiment, the coefficient of thermal expansion is less than or equal to 100 ppm/° C. from 30° C. to 200° C. as measured by thermal mechanical analysis with a thermal ramp rate of 5° C./minute. In another embodiment, the coefficient of thermal expansion can be 5 to 100 ppm/° C. from 30° C.-200° C. as measured by thermal mechanical analysis with a thermal ramp rate of 5° C./minute.

Compositions and articles derived from the compositions can also exhibit advantageous heat aging performance properties. For instance, in one embodiment, a composition (and articles derived from the composition) can have a continuous use temperature of greater than or equal to 150° C. In some embodiments the composition can have a continuous use temperature of 150° C. to 400° C.

Advantageously, the invention now provides previously unavailable compositions and articles. For instance, the compositions can overcome the problem of delamination in an immiscible, incompatible blends and exhibit immiscible, but compatible blend features having highly useful applications. The invention can also provide a range of miscible blend compositions.

The following examples are included to provide additional guidance to those skilled in the art. The examples provided are merely representative are not intended to limit the invention, as defined in the appended claims, in any manner.

EXAMPLES

Materials used in the Examples are listed Table 1. Amounts listed in the Examples are in weight percent based on the combined weight of the first and second polymers used.

TABLE 1

| | |
|---|---|
| PEI 1 (ODPA/DDS) | A polymer comprising structural units derived from oxydiphthalic anhydride and diamino diphenyl sulfone and having a weight average molecular weight of 30,000 g/mol. |
| PEI 2 (BPADA/DDS) | A polymer comprising structural units derived from bisphenol-A dianhydride and diamino diphenyl sulfone and having a weight average molecular weight of 38,000 g/mol. This polymer is commercially available from GE Plastics under the tradename ULTEM XH6050. |
| PEI 3 (BPADA/MPD) | A polymer comprising structural units derived from bisphenol-A dianhydride and meta-phenylene diamine and having a weight average molecular weight of 38,000 g/mol. This polymer is commercially available from GE Plastics under the tradename ULTEM 1000. |
| PEI 4 (BPADA/PPD) | A polymer comprising structural units derived from bisphenol-A dianhydride and para-phenylene diamine and having a weight average molecular weight of |

TABLE 1-continued 37,000 g/mol. This polymer is commercially available from GE Plastics under the tradename ULTEM CRS5001.

Examples 1-5

The purpose of these examples is to show that non-delaminated compositions can be derived from (a) a first polyimide comprising structural derived from a dianhydride and a diamine (b) a second polyimide comprising structural derived from a dianhydride and a diamine wherein the first dianhydride and the second dianhydride are the same or the first diamine and the second diamine are the same. These examples also show that the compositions can overcome the problem of delamination typically found in immiscible, incompatible blends.

Preparation Techniques

The compositions shown in Table 2 were prepared by melt mixing the components in a twin screw extruder at temperatures of 300° C. to 430° C. with vacuum venting. The screw speed typically varied from 100 to 350 RPM.

Testing Techniques

The compositions were tested for glass transition temperature using differential scanning calorimetry (DSC). Morphology was determined transmission electron microscopy at a magnification of 15,000. Delamination was determined by visual inspection using injection molded ASTM tensile bars. "Visual inspection" was determined by normal vision (e.g., 20/20 vision in the absence of any magnifying device with the exception of corrective lenses necessary for normal eyesight) at a distance of one half (½) meter. The compositions were injected molded to form ASTM tensile bars. The samples were visually inspected for appearance. The tensile bars were aged at 280° C. for 240 hours and checked for delamination by visual inspection. Results are shown in Tables 2 and 3.

TABLE 2

| | Example 1 | Example 2 | Example 3 | Example 4* | Example 5* |
|---|---|---|---|---|---|
| PEI 1 (ODPA/DDS) | 95 | 85 | 60 | 95 | 85 |
| PEI 3 (BPADA/MPD) | — | — | — | 5 | 15 |
| PEI 2 (BPADA/DDS) | 5 | 15 | 40 | — | — |
| Tg's | 1 | 2 | 2 | 2 | 2 |
| Morphology | One-Phase | Two-Phase | Two-Phase | Two-Phase | Two-Phase |
| Appearance | Transparent | Translucent | Translucent | Opaque | Opaque |
| Delamination on Heat Aging | No | No | No | Yes | Yes |

*Comparative example

TABLE 3

| | Example 6 | Example 7 | Example 8 | Example 9 | Example 10 | Example 11 |
|---|---|---|---|---|---|---|
| PEI 2 (BPADA/DDS) | 75 | 50 | 75 | 50 | | |
| PEI 3 (BPADA/MPD) | 25 | 50 | — | — | 75 | 50 |
| PEI 4 (BPADA/PPD) | | | 25 | 50 | 25 | 50 |
| Tg's | 1 | 1 | 1 | 1 | 1 | 1 |
| Morphology | One-Phase | One-Phase | One-Phase | One-Phase | One-Phase | One-Phase |
| Appearance | Transparent | Transparent | Transparent | Transparent | Transparent | Transparent |
| Delamination on Heat Aging | No | No | No | No | No | No |

The foregoing examples illustrate the unexpected behavior of polyetherimide blends. Blends of PEI 1 and PEI 3 (Examples 4 and 5), which are made using different dianhydrides and different diamines, show two phase morphology and delamination even at low levels of PEI 3. In contrast, blends of PEI 1 and PEI 2 (Examples 1, 2 and 3), which are both made using the same diamine, show varying behavior depending upon the relative amounts of the two polymers. When the amount of PEI 2 is low (5% PEI 2) then the composition is a miscible polymer blend but as the amount of PEI 2 increases the composition becomes a compatible polymer blend. However, despite the multiphasic resin morphology, blends of PEI 1 and PEI 2 are essentially free from delamination after heat aging at 280° C. for 240 hours, even with at high PEI 2 content Surprisingly, blending polyimides with a common diamine (in this case, DDS) overcame the problem of delamination in an immiscible, incompatible blend and resulted in compatible and/or miscible blends of practical importance.

Examples 6 through 11 are blends of polyimides with a common dianhydride (in this case, BPADA) and different diamines. All of these blends show one-phase morphology and a single glass transition temperature. All of these blends are essentially free from delamination after heat aging at 280° C. for 240 hours. Thus, blending of polyimides with a common dianhydride can also result in non-delaminated compositions of practical importance.

All patents identified by number herein are incorporated by reference in their entirety.

While the invention has been described with reference to a several embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiments disclosed as the best mode contemplated for carrying out this invention, but that the invention will include all embodiments falling within the scope of the appended claims.

What is claimed:

1. A thermoplastic composition comprising a non-delaminated polymer blend wherein the polymer blend comprises:
   a first polyimide consisting of structural units derived from a first dianhydride and a first diamine wherein the first dianhydride is a single dianhydride and the first diamine is a single diamine; and
   a second polyimide consisting of structural units derived from a second dianhydride and a second diamine wherein the second dianhydride is a single dianhydride and the second diamine is a single diamine; and
   wherein the first dianhydride and the second dianhydride are different and the first diamine and the second diamine are the same and wherein the first dianhydride and the second dianhydride are bis(ether anhydrides).

2. The thermoplastic composition of claim 1, wherein the polymer blend is a miscible polymer blend.

3. The thermoplastic composition of claim 1, wherein the polymer blend is a compatible polymer blend.

4. The thermoplastic composition of claim 1, wherein the first and second diamine have the formula:

wherein $R^{10}$ is an aromatic hydrocarbon moiety having 6 to 20 carbons, a halogenated derivative of an aromatic hydrocarbon moiety having 6 to 20 carbons; a straight or branched chain alkylene moiety having 2 to 20 carbons; a cycloalkylene moiety having 3 to 20 carbon atoms; or a divalent moiety of the formula (V)

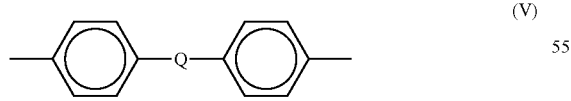

wherein Q is defined as a divalent moiety selected from the group consisting of —O—, —S—, —C(O)—, —SO2—, —SO—, and -CyH2y- wherein y is an integer from 1 to 20.

5. The thermoplastic composition of claim 1, wherein the first dianhydride and the second dianhydride are selected from the group consisting of bisphenol A dianhydride and oxydiphthalic anhydride (ODPA).

6. The thermoplastic composition of claim 1, wherein the first diamine and the second diamine are selected from the group consisting of m-phenylenediamine, p-phenylenediamine, and diamino diaryl sulfones.

7. The thermoplastic composition of claim 1, wherein first polyimide comprises structural units derived from oxydiphthalic anhydride (ODPA) and diamino diaryl sulfone (DAS) and the second polyimide comprises structural units derived from bisphenol-A dianhydride (BPADA) and diamino diarylsulfone (DAS).

8. The thermoplastic composition of claim 1, wherein,
   the first polyimide is present in an amount of 50 to 99 weight percent;
   the second polyimide is present in an amount of 1 to 50 weight percent; and
   the thermoplastic composition further comprises 0 to 70 weight percent of a component selected from the group consisting of fillers, reinforcements, additives, and combinations thereof;
   wherein the first polyimide, the second polyimide, and the component are present at a total weight percent of 100.

9. The thermoplastic composition of claim 1, wherein the polymer blend has a heat deflection temperature of greater than or equal to 150° C. according to ASTM D648.

10. The thermoplastic composition of claim 1, wherein the polymer blend has a tensile strength greater than or equal to 70 MPa according to ASTM D638.

11. The thermoplastic composition of claim 1, wherein the polymer blend has a coefficient of thermal expansion of less than or equal to 100 ppm/° C. from 30° C. to 200° C. as measured by thermal mechanical analysis with a thermal ramp rate of 5° C./minute.

12. The thermoplastic composition of claim 1, wherein the polymer blend has a continuous use temperature greater than or equal to 150° C.

13. A composition of matter comprising a non-delaminated article derived from the composition according to claim 1.

14. A thermoplastic composition comprising a non-delaminated polymer blend wherein the polymer blend comprises:
   50 to 99 weight percent of a first polyimide consisting of structural units derived from a first dianhydride and a first diamine wherein the first dianhydride is a single dianhydride and the first diamine is a single diamine; and
   1 to 50 weight percent of a second polyimide consisting of structural units derived from a second dianhydride and a second diamine wherein the second dianhydride is a single dianhydride and the second diamine is a single diamine;
   wherein the first dianhydride and the second dianhydride are different and the first diamine and the second diamine are the same wherein the first dianhydride and the second dianhydride are bis(ether anhydrides),
   wherein weight percent is based on the total weight of the polymer blend, and
   wherein the polymer blend has a single glass transition temperature.

15. The thermoplastic composition of claim 14, wherein and the first and second diamine have the formula:

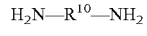

wherein $R^{10}$ is an aromatic hydrocarbon moiety having 6 to 20 carbons, a halogenated derivative of an aromatic hydrocarbon moiety having 6 to 20 carbons; a straight or branched chain alkylene moiety having 2 to 20 carbons; a cycloalkylene moiety having 3 to 20 carbon atoms; or a divalent moiety of the formula

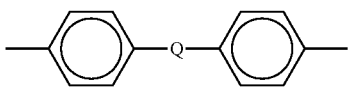

wherein Q is defined as a divalent moiety selected from the group consisting of O—, —S—, —C(O)—, —SO2—, —SO—, and -CyH2y- wherein y is an integer from 1 to 20.

16. The thermoplastic composition of claim 14, wherein the first dianhydride and the second dianhydride are selected from the group consisting of bisphenol A dianhydride and oxydiphthalic anhydride (ODPA).

17. The thermoplastic composition of claim 14, wherein the first diamine and the second diamine are selected from the group consisting of m-henylenediamine, p-phenylenediamine, and diamino diaryl sulfones.

18. The thermoplastic composition of claim 14, wherein first polyimide comprises structural units derived from oxydiphthalic anhydride (ODPA) and diamino diaryl sulfone (DAS) and the second polyimide comprises structural units derived from bisphenol-A dianhydride (BPADA) and diamino diarylsulfone (DAS).

19. The thermoplastic composition of claim 14, wherein the thermoplastic composition further comprises 0 to 70 weight percent of a component selected from the group consisting of fillers, reinforcements, additives, and combinations thereof;
wherein the first polyimide, the second polyimide, and the component are present at a total weight percent of 100.

20. The thermoplastic composition of claim 14, wherein the polymer blend has a heat deflection temperature of greater than or equal to 150° C. according to ASTM D648.

21. The thermoplastic composition of claim 14, wherein the polymer blend has a tensile strength greater than or equal to 70 MPa according to ASTM D638.

22. The thermoplastic composition of claim 14, wherein the polymer blend has a coefficient of thermal expansion of less than or equal to 100 ppm/° C. from 30° C. to 200° C. as measured by thermal mechanical analysis with a thermal ramp rate of 5° C./minute.

23. The thermoplastic composition of claim 14, wherein the polymer blend has a continuous use temperature greater than or equal to 150° C.

24. A thermoplastic composition comprising a polymer blend wherein the polymer blend comprises:
50 to 95 weight percent of a first polyimide consisting of structural units derived from a first dianhydride and a first diamine wherein the first dianhydride is a single dianhydride and the first diamine is a single diamine; and
5 to 50 weight percent of a second polyimide consisting of structural units derived from a second dianhydride and a second diamine wherein the second dianhydride is a single dianhydride and the second diamine is a single diamine;
wherein the thermoplastic composition further comprises 0 to 70 weight percent of a component selected from the group consisting of fillers, reinforcements, additives, and combinations thereof,
wherein the first polyimide, the second polyimide, and the component are present at a total weight percent of 100;
wherein the first dianhydride and the second dianhydride are different and the first diamine and the second diamine are the same and wherein the first dianhydride and the second dianhydride are bis(ether anhydrides),
wherein the polymer blend has greater than one glass transition temperature, and
wherein an article formed by injection molding the thermoplastic composition is essentially free from delamination after aging at 280° C. for 240 hours.

25. The thermoplastic composition of claim 24, wherein the first and second diamines have the formula:

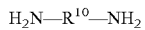

wherein $R^{10}$ is an aromatic hydrocarbon moiety having 6 to 20 carbons, a halogenated derivative of an aromatic hydrocarbon moiety having 6 to 20 carbons; a straight or branched chain alkylene moiety having 2 to 20 carbons; a cycloalkylene moiety having 3 to 20 carbon atoms; or a divalent moiety of the formula

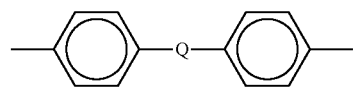

wherein Q is defined as a divalent moiety selected from the group consisting of —O—, —S—, —C(O)—, —SO2—, —SO—, and -CyH2y- wherein y is an integer from 1 to 20.

26. The thermoplastic composition of claim 24, wherein the first dianhydride and the second dianhydride are selected from the group consisting of bisphenol A dianhydride and oxydiphthalic anhydride (ODPA).

27. The thermoplastic composition of claim 24, wherein the first diamine and the second diamine are selected from the group consisting of m-henylenediamine, p-phenylenediamine, and diamino diaryl sulfones.

28. The thermoplastic composition of claim 24, wherein first polyimide consists of structural units derived from oxydiphthalic anhydride (ODPA) and diamino diaryl sulfone (DAS) and the second polyimide consists of structural units derived from bisphenol-A dianhydride (BPADA) and diamino diarylsulfone (DAS).

29. A thermoplastic composition comprising a polymer blend wherein the polymer blend comprises:
a first polyimide consists of structural units derived from a oxy diphthalic anhydride and a diamino diaryl sulfone;
a second polyimide consists of structural units derived from a bis-phenol A dianhydride and a diamino diaryl sulfone.

30. The thermoplastic composition of claim 29, wherein the first polyimide is present in an amount of 10 to 90 weight percent, based on the total weight of the polymer blend and the second polyimide is present in an amount of 10 to 90 weight percent, based on the total weight of the polymer blend.

31. The thermoplastic composition of claim 29, wherein the first polyimide is present in an amount of 50 to 90 weight percent, based on the total weight of the polymer blend and the second polyimide is present in an amount of 10 to 50 weight percent, based on the total weight of the polymer blend.

* * * * *